United States Patent

[11] 3,612,357

[72] Inventor Henry Ruskin
 Cranford, N.J.
[21] Appl. No. 864,109
[22] Filed Oct. 6, 1969
[45] Patented Oct. 12, 1971
[73] Assignee Swingline Inc.
 Long Island, N.Y.
 Continuation-in-part of application Ser. No. 721,722, Apr. 16, 1968.

[54] MOLTEN MATERIAL DISPENSERS WITH CONTROLLED FORCIBLE MANUAL FEEDER FOR RATCHET-TOOTHED HEAT-LIQUEFIABLE ROD, HAVING HEATER AND THERMOSTAT
 19 Claims, 27 Drawing Figs.
[52] U.S. Cl. .................................................. 222/146,
 219/230, 219/421, 228/52, 228/53, 337/392
[51] Int. Cl. ............................................................ B67d 5/62
[50] Field of Search ............................................ 222/146,
 146 HE, 146 H, 391; 221/270; 118/76, 202;
 219/230, 421; 228/52, 53; 337/392

[56] References Cited
 UNITED STATES PATENTS
 2,681,685 6/1954 Arkless ...................... 219/421 X
 3,197,076 7/1965 Chamblee .................. 222/146 HE
 2,995,159 8/1961 Berggren ................... 222/146 HE Primary Examiner—Stanley H. Tollberg
Attorney—Paul S. Martin ABSTRACT: The disclosed gun especially for glue sticks has a melting chamber with an electric heater conspicuously closer to the melted-material discharge nozzle than to the solid material inlet end and a thermostat conspicuously closer to the solid material inlet end than to the nozzle end of the heating chamber for accommodating the supply of electric heat to the rate of discharge of the molten material. The gun has a hand grip carrying the heating chamber, and a pawl-carrying reciprocable manual driver is disposed at the side of the hand grip remote from the nozzle. The driver is controllably but powerfully operable by the squeeze of a hand that embraces the hand grip and the driver. The liquefiable material has ratchet teeth engaged by the manually driven pawl. The ratchet-toothed rod enters the melting chamber in solid state and acts as a piston for the molten material in the melting chamber.

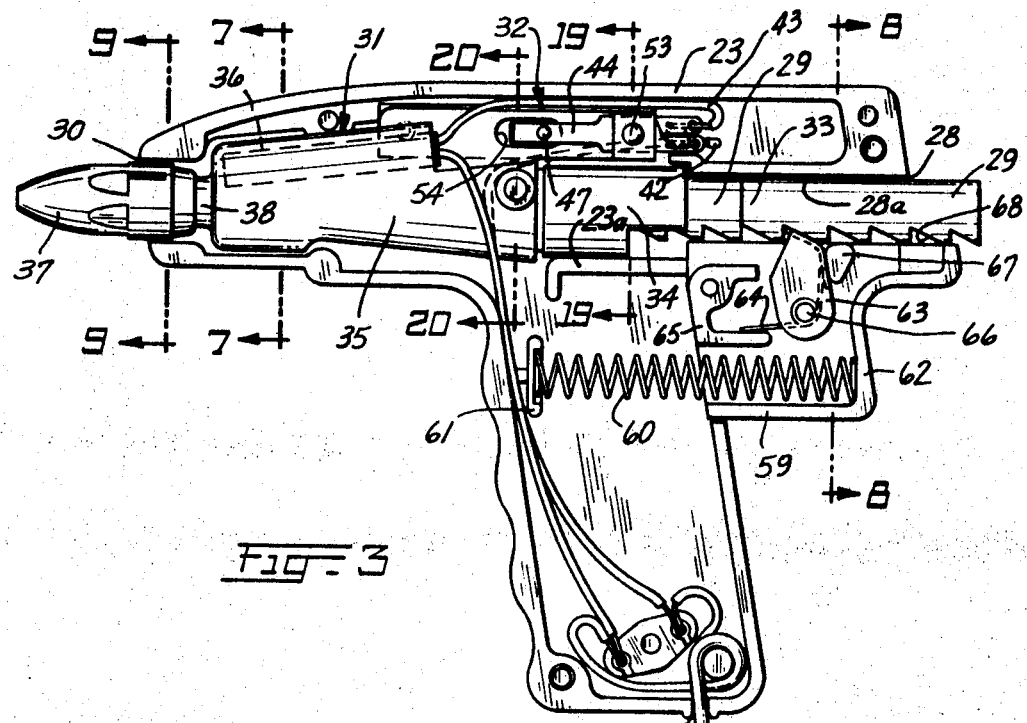

 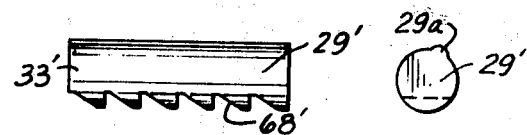
Fig. 11A  Fig. 11B  Fig. 12A  Fig. 12B
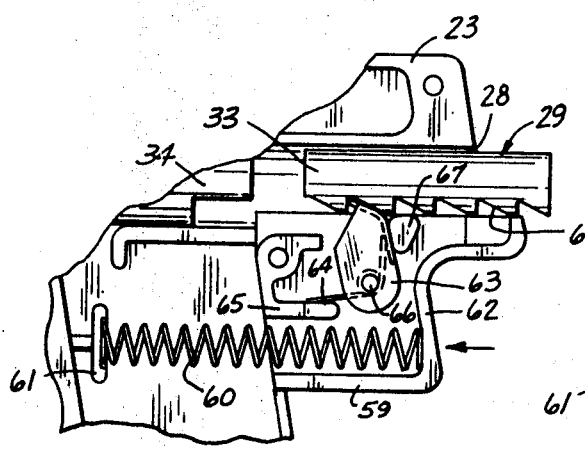 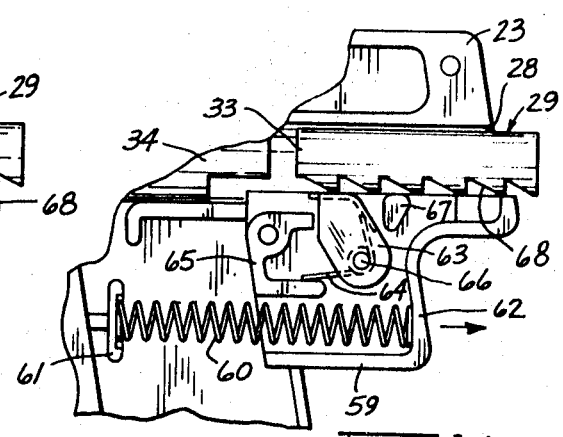
Fig. 13  Fig. 14
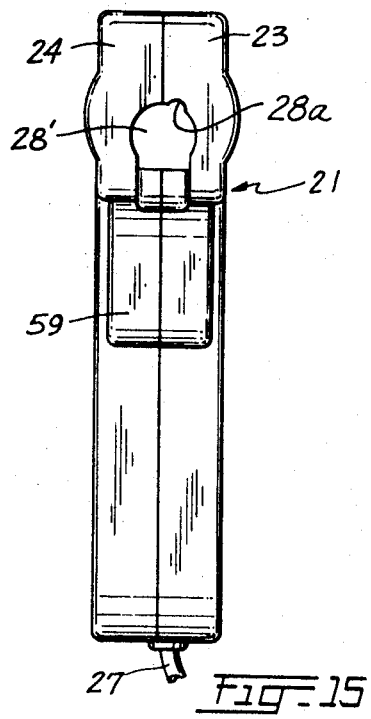
Fig. 15
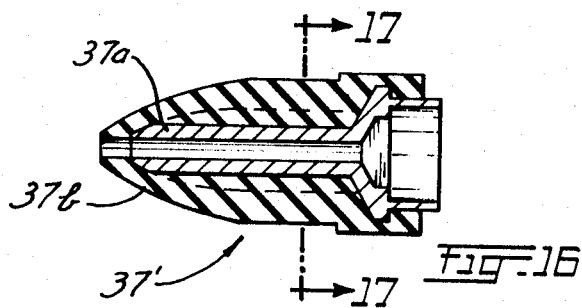
Fig. 16
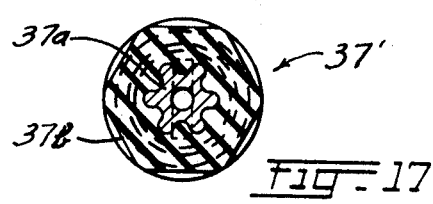
Fig. 17

3,612,357

MOLTEN MATERIAL DISPENSERS WITH CONTROLLED FORCIBLE MANUAL FEEDER FOR RATCHET-TOOTHED HEAT-LIQUEFIABLE ROD, HAVING HEATER AND THERMOSTAT

This is a continuation-in-part of my copending application, Ser. No. 721,722, filed Apr. 16, 1968.

This invention relates to dispensers for liquefied normally solid material.

Heat-liquefiable solid materials are commonly used for various purposes. For example, if the material is a glue that becomes fluid when heated, it is liquefied and then applied to two parts to be joined together. The parts are pressed together while the glue is fluid, and a joint is formed rapidly. Clamps can be used but are not required. Similarly, normally solid caulking material can be melted and injected into crevices, where it solidifies on cooling.

In what follows, the term "heat-liquefiable material" is called "glue" for convenience, but that term is used to represent the class of heat-liquefiable materials that can be dispensed like glue. Correspondingly, where any such material is solid, it is called a "glue stick" or a "glue rod." Dispensers for such melted materials are often hand tools, which are called "guns" in this specification. These terms are to be understood as signifying their equivalents, and are not limiting.

In glue guns, the glue is admitted to a melting chamber as a solid and it is discharged as a fluid. An object of the present invention resides in providing a novel glue gun having an electrically heated melting chamber and a thermostatic control mounted on the melting chamber, for melting the glue stick rapidly while avoiding overheating of the liquefied glue. In this connection, a more particular object of the invention resides in providing a glue gun with a melting chamber and a thermostat so related to the melting chamber as to accommodate the supply of heat to both rapid and slow glue discharging rates, while maintaining near-uniform temperature of the melted glue in the melting chamber.

A further object of the invention resides in providing a novel glue gun having a convenient, economical and highly effective arrangement for extruding or dispensing melted glue from the gun.

The nature of the invention will be more fully understood from the detailed description appearing below of an illustrative glue gun and modifications thereof which are shown in the accompanying drawings. Briefly, the illustrative glue gun includes an elongated heating chamber (sometimes called a "glue pot" below) having a discharge nozzle at one end and a glue stick acting as a piston at the open inlet end of the heating chamber. The heating chamber has a metal wall that contains an electric heater. A tubular wall of molded plastic forms a guide passage for the glue stick entering the melting chamber. The heating chamber and the tubular plastic wall form an elongated container for fluid and softened glue.

The nozzle has a valve that enables the person using the glue gun to shut off the discharge end of the gun, or to allow glue to be discharged freely. When glue is discharged rapidly, a maximum of heat is required. The glue gun is kept hot so that fluid glue is available for use as needed, but if no glue is used for some time, then much less heat is needed. The illustrative gun has a thermostatic control located at the inlet end of the heating chamber. This arrangement accommodates the supply of heat to widely varied discharge rates of the glue.

The temperature control system achieves rapid on-off cycling. If there were a long total on-and-off cycle time, the temperature of the dispensed glue could vary widely during each cycle. The construction detailed below is capable of a very short on-and-off heating cycle, and tends to maintain nearly constant temperature of the fluid glue at the discharge end of the heating chamber or glue pot.

A further important advantage of the invention is that glue guns having the foregoing excellent operating characteristics can be made relatively light and compact.

The illustrative glue gun to be considered in detail below has a further notable feature. Manually actuated means is provided for forcibly extruding melted glue from the nozzle. The manual glue extrusion means includes a manual driver adjacent to the handgrip, a feed-pawl carried by the driver and operable in a driving stroke against one of a series of ratchet teeth formed in a glue stick. The manual driver is at the back of the handgrip, so that a person using the gun naturally presses his fingers against the front of the handgrip and applies the lowest joint of his thumb against the manual driver. In this way, the user's hand grip is capable of applying considerable pressure to the glue extrusion means with only modest effort. The end of the glue stick entering the melting chamber acts as a piston against the fluid glue in the melting chamber. The ratchet-toothed glue stick forms a force-transmitting link to the fluid glue from the feed pawl of the manual driver.

The temperature-control features mentioned above are important for yet another reason. The supplied heat should be capable of dependable regulation to assure a required maximum rate of dispensing fluid glue as already stated; and yet, when glue is to be dispensed slowly or at random moments, the temperature rise should be limited at the inlet end of the elongated container. At such times, an excessive supply of heat to the heating chamber would cause too much of the glue stick to soften. The glue stick would no longer be operable by the feed pawl and hence it would not be effective as a piston rod and piston acting on the fluid glue. Temperature control is important to avoid premature softening of the glue stick. The temperature control achieved by the relationship of the thermostat and the heater to the heating chamber promotes success of the manual glue-extruding means.

The foregoing and further objects, novel features and advantages of the invention will be better appreciated from the following detailed description of an illustrative embodiment of the invention, and of modified portions thereof shown in the accompanying drawings, which are made a part of this specification.

In the drawings:

FIG. 3 is a view similar to that of FIG. 1 but with one of the halves of the housing removed to show the internal structure;

FIG. 4 is a detail plan view, on an enlarged scale, of the thermostat and associated parts of the dispenser of FIGS. 1–3. In FIG. 4 the contacts of the thermostat are shown closed;

FIG. 5 is a view similar to that of FIG 4, showing the contacts of the thermostat open due to a temperature rise;

FIG. 6 is a view similar to that of FIGS. 4 and 5, but showing the contacts of the thermostat open by operation of the adjustment means to the "off" position;

FIGS. 11A and 11B are lateral and right-hand end views of a glue stick of the dispenser in FIGS. 1–10;

FIGS. 12A and 12B are lateral and right-hand end views of an alternative form of glue stick;

FIG. 13 is a fragmentary side elevational view, with one-half of the housing removed, showing a pawl of the glue-stick driving mechanisms pushing the glue stick toward the heating chamber;

FIG. 14 is a view similar to FIG. 13 but showing the pawl being retracted in preparation for engaging another ratchet tooth of the glue stick;

FIG. 15 is a rear elevation of the glue gun of FIGS. 1–7 modified to accommodate the glue stick of FIGS. 12A and 12B;

FIG. 16 is a longitudinal cross-sectional view of a modified nozzle for the glue gun shown in FIGS. 1–8;

FIG. 17 is a cross-sectional view taken along line 17—17 of FIG. 16;

Figure 1:
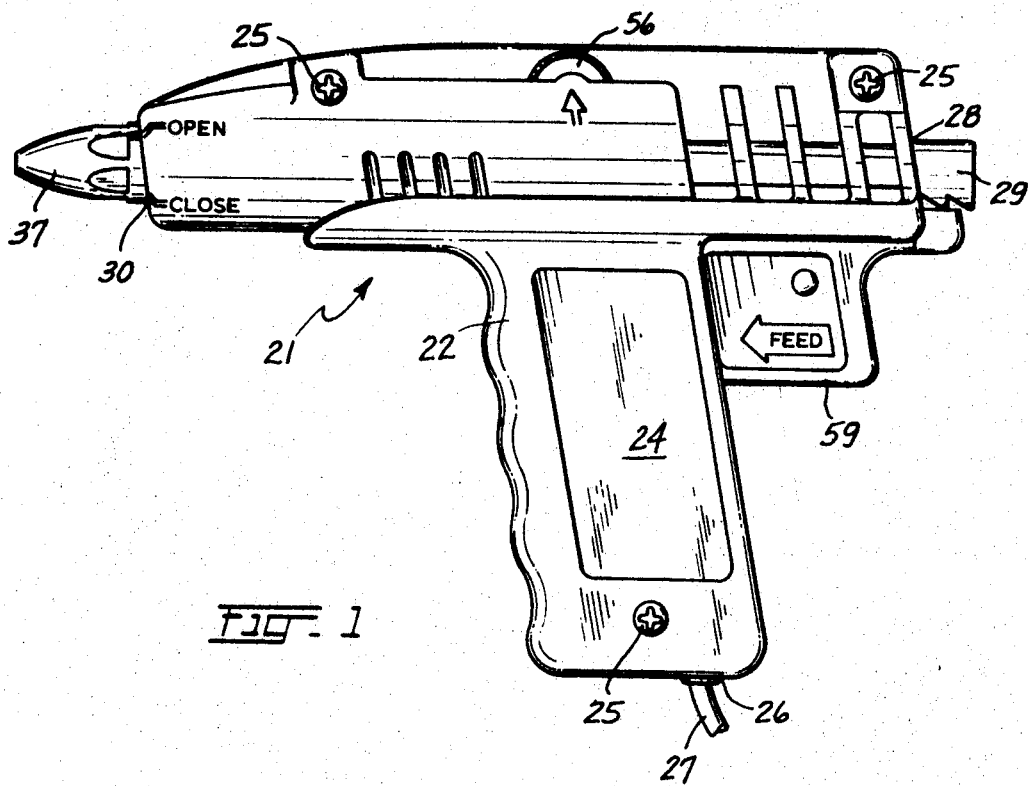
FIG. 1 is a side elevational view of dispenser, as an illustrative embodiment of the invention.
Figure 2:
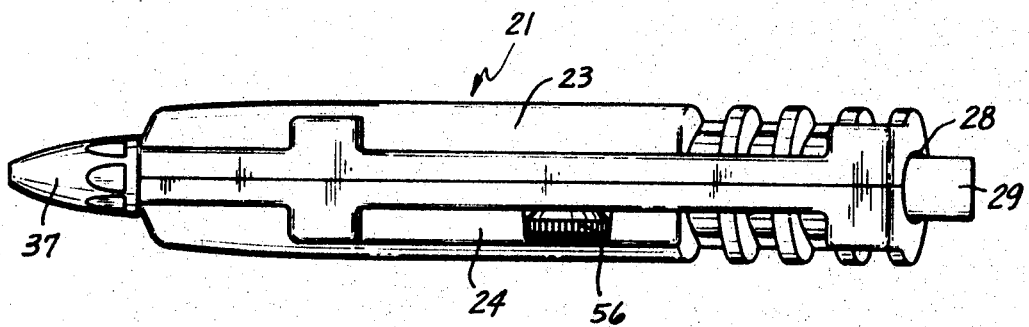
FIG. 2 is a top plan of the structure shown in FIG. 1.

Referring to the drawings, the dispenser or glue gun has a housing 21 made of a heat-insulating material such as molded phenolic plastic, and having a handgrip portion 22. Housing 21 comprises a front portion 23 and a back portion 24. Portions or covers 23 and 24 are secured together by screws 25.

A conventional power cord 27 extends through opening 26 into housing 21. An additional opening 28 accommodates glue stick 29. Housing 21 also has an additional opening 30 through which the nozzle end of container 31 projects. Thermostat 32 is fabricated on heating chamber 35, more fully described below.

Figure 9:
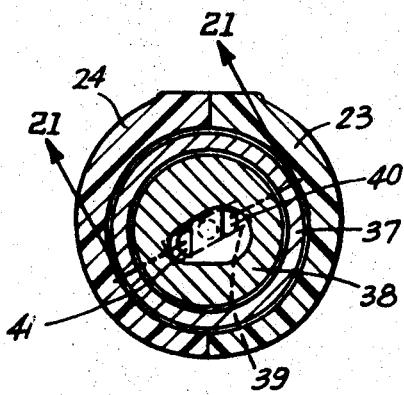
FIG. 9 is a cross-sectional view taken along line 9—9 of FIG. 3. In this view the value which controls the discharge of the liquefied material is shown open.
Figure 10:
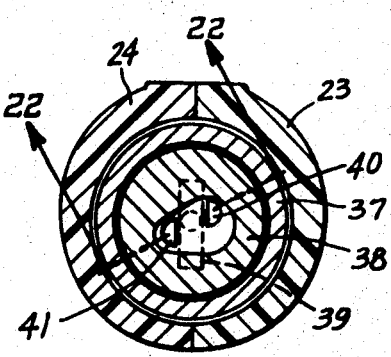
FIG. 10 is a view similar to that of FIG. 9, but showing the valve closed.

Material container 31 includes a generally cylindrical inlet and guide part 34 extending from hollow conical heating chamber 35. Part 34 has a conical fitting extending into heating chamber 35 (see also FIG. 23). Part 34 is made of a material having poor heat-conductivity such as molded phenolic plastic, and heating chamber 35 is of metal such as aluminum having good heat conductivity. A heating element 36 is disposed within the wall of heating chamber 35. Secure to outlet portion 38 of heating chamber 35 is a rotatable metal nozzle 37. A longitudinal passage 39 in nozzle 37 has a small circular opening at the tip of the nozzle, and the opposite end of passage 39 is a thin but wide rectangle, as shown in FIGS. 9 and 10. A pair of openings 40 and 41 are spaced from one another and are disposed in an end wall at the nozzle end of heating chamber 35. As nozzle 37 is rotated, slot 39 can be aligned with openings 40 and 41 (FIGS. 9 and 21) and thereby permit fluid to be discharged. Nozzle 39 can also be rotated so that passage 39 is misaligned with openings 40 and 41 (FIGS. 10 and 22), thus acting as a valve to stop the flow of fluid.

Figure 18:
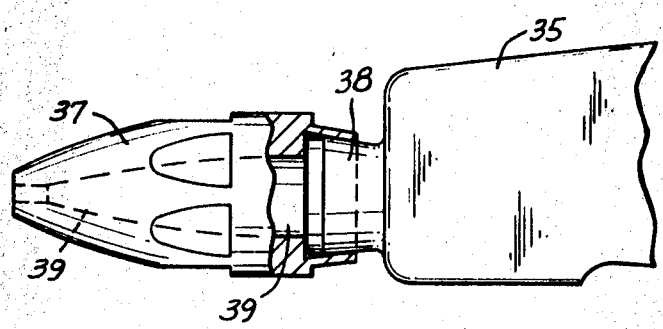
FIG. 18 is a fragmentary side elevational view, partly in cross section, showing the junction between the heating chamber and the nozzle of the glue gun in FIGS. 1-8.
Figure 21:
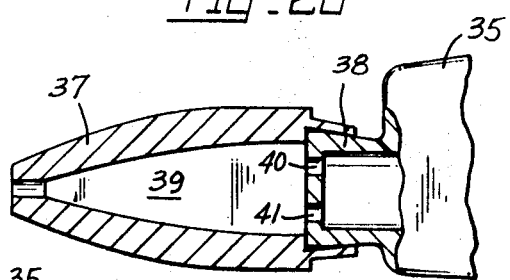
FIG. 21 is a sectional view taken along line 21—21 of FIG. 9.
Figure 22:
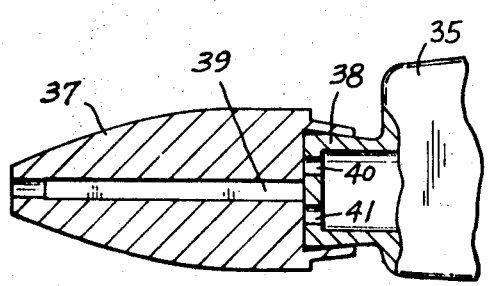
FIG. 22 is a sectional view taken along line 22—22 of FIG. 10.

Heater 36 is confined essentially to the forward half of heating chamber 35 that carries nozzle 37. Moreover, nozzle 37 has a large area in firm surface contact with portion 38 at the forward end of heating chamber 35, as shown in FIGS. 18, 21 and 22. In this way, nozzle 37 is kept suitably hot and its passage 39 stays free-flowing when the valve 39-40/41 is open.

Insulated wires 42 and 43 are joined to electrical contacts 44 and 45 forming part of thermostat 32. Contacts 44 and 45 are identical parts, mounted symmetrically opposite each other and they have outward bumps 46 and 47. When contacts 44 and 45 are in engagement, power is connected from power cord 27 to heater 36. Power is interrupted when contacts 44 and 45 separate.

A generally flat bar 48 that is relatively thin and wide extends edgewise upward from the rear or inlet half of heating chamber 35, and an approximately equal length of bar 48 extends into the space over inlet guide 34 of the elongated container 31. A strip 50 of metal extends along one side of bar 48. A recess 49 is defined by relatively raised mounting areas at the ends of bar 48, and strip 50 arches or bows into this recess when the thermostat is cold (FIG. 4). The ends of strip 50 are fixed firmly to bar 48 by hollow rivets 52 that are advantageously integral with bar 48.

Figure 19:
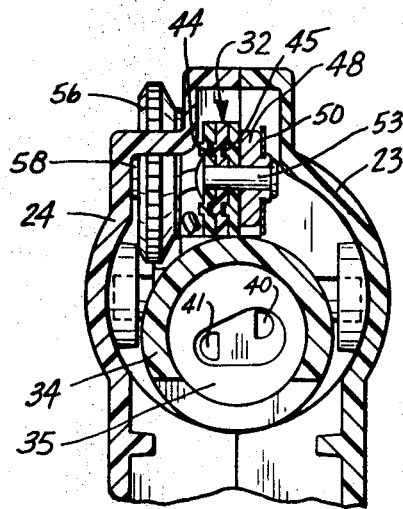
FIG. 19 is a cross-sectional view taken along line 19—19 of FIG. 3.

A window 54 is formed in bar 40. A screw 55 of electrical insulation is threaded through strip 50. Screw 55 extends through window 54 and presses against electrical contact 45. A switch wheel 56 is rotatably mounted on shouldered pin 58 on front portion 23 of the housing (FIG. 19). Switch wheel 56 has a cam surface that cooperates with bump 47 of contact 44. The cam surface has a low point 57 which allows contact 44 to part from contact 45 when the thermostat is cold (room temperature) as shown in FIG. 6. Other parts of the cam surface adjust bump 47 to establish the manually adjusted position of contact 44 for selecting a temperature in the range of the thermostat.

Bar 48 and strip 50 have unequal thermal coefficients of expansion. In the construction shown, bar 48 is of aluminum and extends integrally from the heating camber 35. Strip 50 is of stainless steel, having a much smaller coefficient of expansion than aluminum. When bar 48 is heated, its length increases, and its increased length is greater than that of strip 50. As a result, the arching or bowing of strip 50 decreases. Strip 50 becomes straight as a limiting condition, a limit that is approached at the maximum operating temperature of the glue gun.

When switch wheel 56 is set to an operating point and contacts 44 and 45 close to energize heater 36, the thermostat is heated and bar 48 elongates more than strip 50. The bowing of strip 50 decreases, and at some elevated temperature determined by the initial adjustment of screw 55 and the manual setting of switch wheel 56, contacts 44, 45 separate and interrupt the current to heater 36.

The handgrip portion 22 of housing 21 has a front edge normally engaged by the user's fingers when aiming nozzle 37 at the spot where glue is to be deposited. At the rear of handgrip 22, there is a manual driver 59, in position to be easily but powerfully squeezed forward (in the "Feed" direction, FIG. 1) by the lowest joint of the user's thumb. The maximum force of a person's grip is thus directly available. Considerable force can be applied to driver 59 with ease. Driver 59 is biased rearward by compression coil spring 60. This spring bears against flat 62 in driver 59 and reacts against foot 61 in handgrip portion 22 of the housing.

A pawl 63 on pivot 66 in driver 59 is biased clockwise, as seen in FIG. 3, by torsion spring 64. Pawl 63 normally bears against a stop 67 integral with driver 59. Spring 64 is supported on pivot 66 and reacts against retainer 65. Pawl 63 engages ratchet teeth 68 in a glue stick 29 during the squeeze-operation of driver 59. Driver 59 has opposed grooves which receive guide portions 23a and 24a of the back and front covers, respectively. Guide portions 23a and 24a are long and straight, and they serve to guide driver 62 so that pawl 63 moves along glue stick 29. Passage 28a extending from opening 28 to tubular guide part 34 contains one short glue stick 29 whose front end 33 bears against another glue stick 29. The stroke of driver 59 is approximately half the length of one of these glue sticks. During a squeezing operation (FIG. 13) driver 59 forces pawl 63 against glue stick 29, and this glue stick drives another (as seen in FIG. 3) into the melting chamber. During moments when driver 62 is released, spring 60 forces driver 59 to retract pawl 63 (FIG. 14). During this return stroke, pawl 63 moves counterclockwise against its spring bias.

The edge of pawl 63 which engages a ratchet tooth in a glue stick 29 also acts to maintain teeth 68 at the bottom of the feed passage 28. For better assurance that the glue stick cannot rotate so as to carry the ratchet teeth out of proper cooperation with pawl 63, a guiding ridge 29a along the length of glue stick 29' could be adopted (FIGS. 12A and 12B). Opening 28' (FIG. 15) would be modified correspondingly so that the glue-stick passage would include a groove 28a to receive ridge 29a. The reverse of this arrangement could also be used, namely a guiding ridge (not shown) projecting into feed passage 28' and extending along glue sticks 29 into the heating chamber for cooperating with grooves in the successive glue sticks. Likewise, plural ridges and plural grooves could be used. However, the projection of pawl 63 into cooperation with the glue sticks 29 in the spaces between the ratchet teeth has been found effective to maintain cooperation of pawl 63 with the ratchet teeth as the glue sticks advance into the melting chamber. It is only required that the user should insert each new glue stick with the ratchet teeth facing the pawl. No special accuracy is needed.

It has been said above that the heater 36 is confined essentially to the forward end of the heating chamber 35. The effect of locating the heater there is to develop the highest temperature in the melting chamber adjacent the nozzle and yet to develop some heat in the glue stick as it approaches the front half of the heating chamber. In a practical form of the glue gun shown, the wall thickness at the inlet half of the heating chamber 35 was about 0.05 inch, and the average wall thickness at the half of the heating chamber nearest the nozzle was much greater; the overall length of the heating chamber 35 was about 2⅝ inches; and the diameter of the passage at the inlet end of the heating chamber was about one-half inch, becoming progressively narrower toward the nozzle. The proportions and the operation of the heating chamber 35 in FIG. 3 are well represented in FIG. 24 for the modification 35'. The heat from heater 36 is much more effective in developing a high temperature in the forward half of the heating chamber containing liquefied glue 29a than the rear or inlet half of the heating chamber. This is because heat from heater 36 is conducted to all parts of the forward half of the heating chamber via the short and relatively thick heat conduction paths transverse to the elongated heater and transverse to the elongated heating chamber. The rear or inlet half of the heating chamber draws its heat by conduction along the wall from the front half of the heating chamber, and that heat is transferred to the portion of the glue entering the heating chamber. Accordingly, the temperature of the inlet of the heating chamber drops progressively toward the inlet end.

Along approximately half of its length, the thin, wide bar 48 of the thermostat extends integrally edgewise from the inlet half of the heating chamber 35, providing excellent assurance that bar 48 will assume nearly the same temperatures as the joined portion of chamber 35. The rest of thermostat bar 48 extends laterally along the plastic guide part 34. Accordingly, the thermostat responds to a range of temperatures of the glue stick, from that part of a glue stick that is just entering the heating region to the part that has become fluid. The thermostat senses the part of the glue stick that is changing from a solid to a fluid. At maximum dispensing rates, the thermostat is cooled by the relatively low temperature of the glue sticks entering the zone of the thermostat, while at a minimum dispensing rate, the material in the region opposite the thermostat is much warmer. Operation of the thermostat produces on and off periods in an energization cycle of heater 36. When the cool glue stick moves rapidly into the thermostat zone, the proportion of the "on" times in the heating cycles is long. When little glue is discharged, the "on" times are short.

Figure 23:
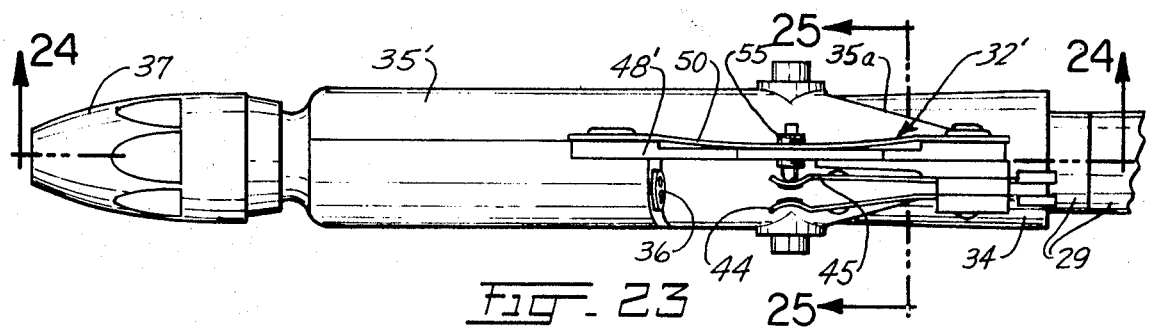
FIG. 23 is a top plan view of a modified form of material container and thermostat useful in the glue gun of FIGS. 1-8, drawn to larger scale than FIGS. 1-3.
Figure 24:
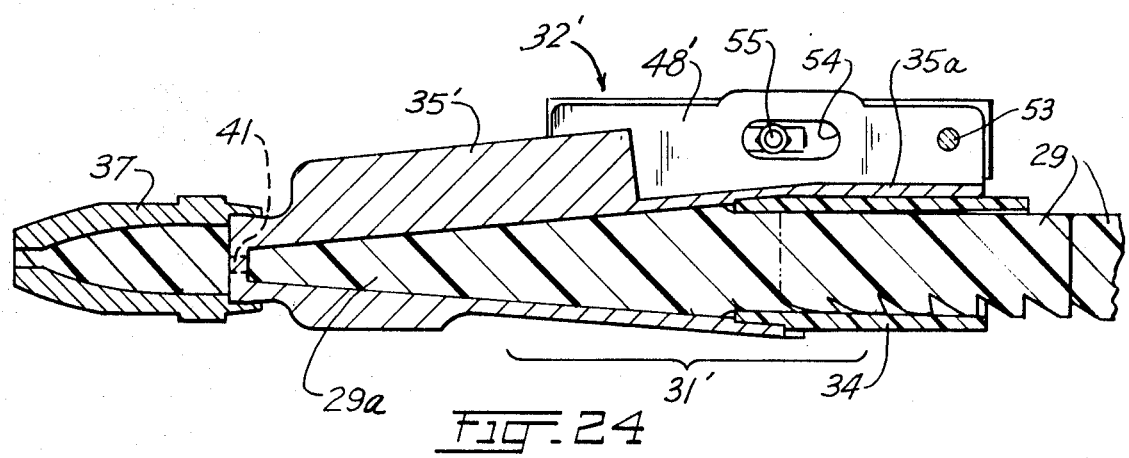
FIG. 24 is a vertical longitudinal cross section of the structure in FIG. 23 along the line 24—24 therein.
Figure 25:
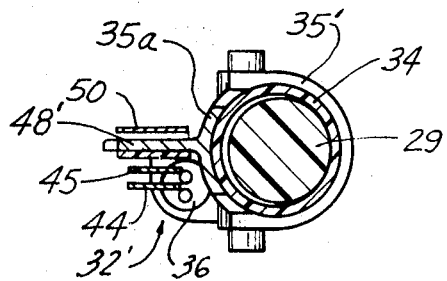
FIG. 25 is a vertical transverse cross section of the structure in FIG. 23 along the line 25—25 therein.

A modification of the integrated thermostat and heating chamber of FIGS. 3–6, 19 and 20 is shown in FIGS. 23–25. The same numerals are used in FIGS. 23–25 for the same parts, which have already been described. Primed numerals designate corresponding parts that are modified in the particulars that follow.

Lateral stability of bar 48' is enhanced by the addition of a metallic extension 35a of the cylindrical wall of heating chamber 35'. Bar 48' extends integrally from extension 35a so that bar 48' and extension 35a are T-shaped in transverse cross section (FIG. 25). The effect is to minimize the possibility of warping and to resist transverse stresses against the extended part of bar 48', to preserve the calibration of the thermostat.

Extension 35a has a large area facing a corresponding area of the glue stick, and it is heated by conduction through the relatively thin wall of member 34. Extension 35a is also heated by lengthwise conduction from the inlet part of the heating chamber that is in contact with the glue as it becomes soft. Therefore the temperature of extension 35a and of thermostat bar 48' is determined largely by the temperature of the glue in the zone opposite the thermostat. As previously explained, this construction accommodates the heat supplied under control of the thermostat (averaged over the on-and-off parts of the heater energization cycle) to the rate of dispensing glue and therefore the thermostat adjusts the supply of heat to the rate at which solid glue enters the heating chamber.

The mass of the heating chamber is preferably quite small, so that the glue gun can be small and light. The on-and-off cycle of heating is relatively short due to the responsiveness of the thermostat, so that very little change in temperature of the glue occurs at different times in the heating cycle. In a practical form of the glue gun shown, there was an on-and-off cycle of 18 seconds, including 14 seconds "off" and 4 seconds "on," when tested with the heating chamber empty; and during that time the temperature in the heating chamber near the nozzle was constant at 325° F. for a given setting of the switch wheel 56.

The glue stick entering the heating chamber becomes progressively softer as it approaches the front half of the heating chamber where it becomes fluid. The part of the glue stick that is still solid should be within container 31 or 31', because it acts as a piston in extruding fluid glue from the nozzle when driver 59 and handgrip 22 are squeezed.

When glue is not dispensed and when switch wheel 56 is in an operating setting, there is tendency of heat to travel along parts 35 and 34 and along the heated glue itself toward the inlet end of tubular member 34. Softening of the glue outside member 34 is to be avoided. This is important for various reasons. Notably, one glue stick that is forced forward by pawl 63 and driver 59 should act as a piston for developing pressure on the fluid glue near nozzle 37. That piston action would not develop if the part of the glue stick projecting out of tubular guide 34 should become significantly soft. It is important that the glue stick which is operated by driver 59 should be capable of acting as a force transmitting link to the end of the glue stick that acts as a piston. This further underscores the importance of effective temperature control. The glue gun should have a cold region in the operating range of pawl 63, an intermediate range in phenolic member 34 and a fluid region opposite heater 36.

Figure 7:
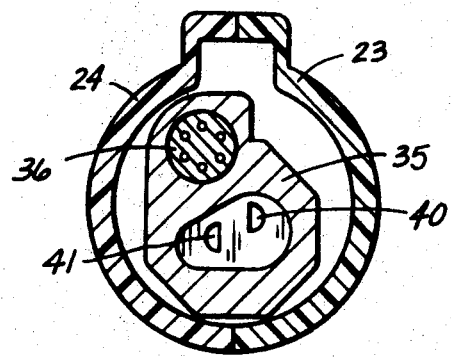
FIG. 7 is a cross-sectional view taken along line 7—7 of FIG. 3.
Figure 8:
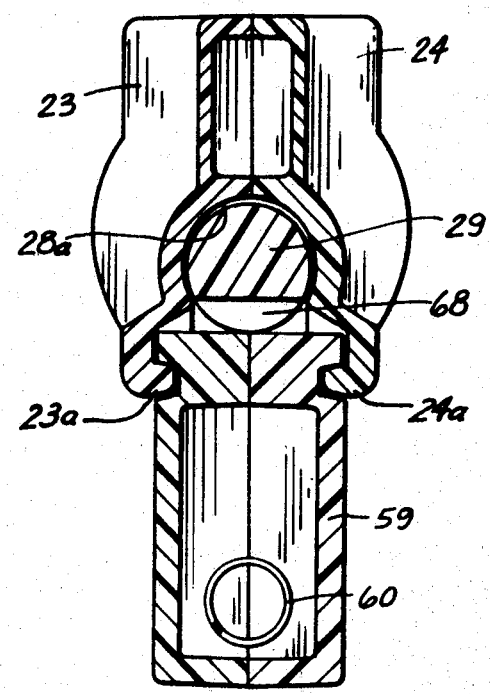
FIG. 8 is a cross-sectional view taken along line 8—8 of FIG. 3.
Figure 20:
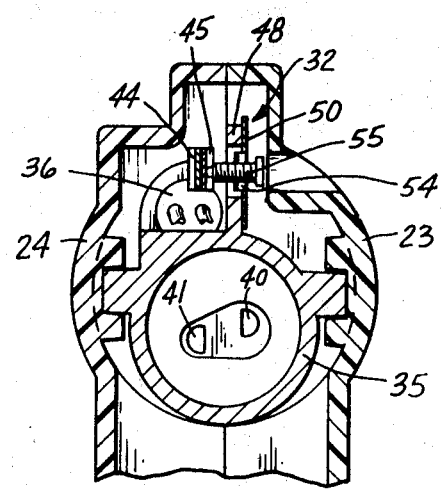
FIG. 20 is a cross-sectional view taken along line 20—20 of FIG. 3.

Covers 23 and 24 enclose the entire material container 31 and the thermostat, conserving the heat developed in the heating chamber and protecting the thermostat against ambient conditions that might interfere with its responsiveness. As seen in FIGS. 7, 19 and 20, the heating chamber is spaced from the covers 23 and 24 except for the minimum-size formations required for holding the heating chamber in place.

Nozzle 37 of metal tends to become quite hot. An alternative form of nozzle 37' in FIGS. 16 and 17 has a metal core 37a and a jacket 37b of molded plastic which acts as a heat insulator to keep core 37a warm and to protect the user from harm in case he should accidentally touch the nozzle. Other variations and varied applications of the novel features discussed above will occur to those skilled in the art. Consequently, the invention should be construed broadly in accordance with its full spirit and scope.

What is claimed is:

1. A dispenser for heat-liquefiable material including an elongated material container comprising a heating chamber having successive forward and rear portions and having a nozzle at its forward end, said material container being open at its rear end remote from said nozzle for admitting solid heat-liquefiable material to be melted and dispensed, an electric heater disposed in prominently more effective heat-transfer relation to the forward portion of the elongated material container than to the rear portion thereof, and a thermostat connected in control relation to said electric heater and disposed in prominently more effective heat transfer relation to the rear portion of the material container than the forward portion thereof for adjusting the averaged heating rate of the heater to the rate at which solid heat-liquefiable material enters the material container and replaces fluid material dispensed from the nozzle, said thermostat comprising a first metal part of relatively high thermal coefficient of expansion and a second metal part of relatively low thermal coefficient of expansion and a switch controlled by said metal parts, and said high-thermal-expansion metal part being integrally part of said heating chamber.

2. A dispenser in accordance with claim 1, wherein said material container includes a tubular member of heater insulating material for guiding material into said heating chamber, and wherein said metal parts are elongated and extend along both said tubular member and the rear portion of said heating chamber.

3. Means for dispensing fluid comprising a gun having a handgrip and means including a heating chamber supported by the handgrip, said heating chamber having a nozzle at one end for dispensing liquefiable material in its melted state, and a rod of heat-liquefiable material at the other end of the chamber for applying pressure to melted material in the chamber, said rod having a series of ratchet teeth, manual means for providing direct firm driving force from the hand that holds said handgrip to at least one of said ratchet teeth, said manual means comprising a manual driver disposed adjacent said handgrip and adapted to be embraced with said handgrip by a person's hand when holding the handgrip and operated forcibly but controllably by squeezing the manual driver and the handgrip, said manual driver having a pawl engageable directly with at least one of said ratchet teeth for transmitting firm manual pressure against the melted material in the heating chamber for forced discharge from the nozzle.

4. A fluid-dispensing gun in accordance with claim 3, wherein said manual driver has a hand-engageable part at the side thereof remote from said nozzle and wherein said handgrip has a hand-engageable part at the side of said handgrip nearest said nozzle so that a strong force can be applied easily to said driver by a person's hand while clutching said handgrip.

5. A fluid-dispensing gun in accordance with claim 3, wherein said pawl is constrained to reciprocate along said rod of heat-liquefiable material.

6. A fluid-dispensing gun in accordance with claim 3, wherein said nozzle is rotatable and constitutes a valve member for controlling the discharge of fluid from the gun.

7. A dispenser for heat-liquefiable material, including an elongated material container comprising a heating chamber having a nozzle at its forward end, said material container being open at its rear end remote from said nozzle for admitting solid heat-liquefiable material to be melted and dispensed, an electric heater disposed in heat-transfer relation predominantly to a forward portion of the elongated material container and a thermostat connected in control relation to said electric heater and disposed in heat transfer relation predominantly to a rear portion of the material container for adjusting the averaged heating rate of the heater to the rate at which solid heat-liquefiable material enters the material container and replaces fluid material dispensed from the nozzle, said heating chamber being an elongated hollow metal member having a relatively thin wall at the rear thereof and said material container including a material guiding tubular member of poor heat-conducting material extending rearward of the heating chamber, said thermostat including an elongated metal bar integral with the rear portion of said heating chamber and extending outward of and along said thin wall and said bar having an extending portion along the exterior of said tubular member, said bar having a relatively high thermal coefficient of expansion, and said thermostat including a strip of metal having a relatively low thermal coefficient of expansion extending along said bar, said strip being slightly bowed at low temperatures and being nearly straight at the maximum control temperature of the thermostat, and a switch operable by said strip for controlling the energization of said heater.

8. A dispenser in accordance with claim 7, wherein said thin wall of said heating chamber has a narrow rearward extension along the exterior of said tubular member integral with said rearward extending portion of said bar.

9. A dispenser in accordance with claim 7, wherein said switch includes a first contact mechanically coupled to said strip and a second contact cooperable with said first contact, and an adjustable control member mechanically coupled to said second contact for controlling the closure of said switch and for adjusting the operative temperature of the thermostat.

10. A dispenser in accordance with claim 1, wherein said first metal part is an elongated bar of metal extending along said rear portion of said material container, and wherein said second metal part is a strip of metal secured to the ends of said bar, said strip being nearly straight at high temperatures and being bowed at low temperatures, and wherein said thermostat includes a switch controlling the energization of said heater and mechanically coupled to said metal strip for operation thereby.

11. Means for dispensing fluid in accordance with claim 3, wherein the rod of heat-liquefiable material is segmented into successive ratchet-toothed unit lengths, the unit length that applies pressure directly to the melted material in the chamber being itself pressed by another unit length that is engaged by the pawl.

12. Means for dispensing fluid in accordance with claim 3, wherein there are short lengths of said rod of liquefiable material between notches that form said ratchet teeth, said short lengths having a cross-sectional size and shape to substantially occupy the inlet end of the heating chamber to act as a piston for developing pressure in the molten material.

13. A dispensing device for heat-liquefiable normally solid material in the form of an elongated element having a plurality of holding portions thereupon, said device comprising a housing, a material container within said housing, a heating element operatively connected with said material container, an opening within said housing for introducing said elongated element into said material container, an opening operatively connected with said container for removing said liquefied material therefrom, a slidably movable driver movable along a path parallel to an elongated element within the material container and having an actuating part directly connected thereto, said actuating part adapted to abut at least one of said holding portions of said elongated element and to propel said elongated element into said material container, the pressure applied to said driver controlling the rate of propulsion of said elongated element.

14. A dispensing device as described in claim 13, including a valve member within said opening for removing said liquified material, said valve member including a pair of spaced openings and a rotatable junction element therebetween, said junction element provided with a slot having a pair of spaced sides and a pair of open end portions.

15. A dispensing device as described in claim 14, including thermostatic means for controlling said heating element, said thermostatic means including a pair of electrical contacts for controlling power application, a metallic holding member screwed to said housing and provided with a recess therewithin, a metallic actuating member of a metal of a different rate of expansion and contraction than that of said holding member secured to said holding member and disposed across said recess in inwardly arcuate relationship, and a nonconductive adjustment member secured to said actuating member and in abutting relationship with one of said contacts.

16. A dispensing device as described in claim 15, including a projection upon the other of said contacts, a rotatable control member carried by said housing and provided with a recess at least equal in depth to the height of said projection, and an inclined recess abutting said first named recess and engageable with said projection to cause the position of one contact to be shifted relative to the other contact as the control member is rotated.

17. A dispenser for heat-liquefiable material comprising a gun having a handgrip and means including a heating chamber supported by the handgrip, said heating chamber including a heating element therefor and having a nozzle at one end for dispensing liquefiable material in its melted state and having a passage for admitting a ratchet-toothed rod of liquefiable material to the chamber to be melted therein, and a manual driver disposed adjacent said handgrip and adapted to be embraced with said handgrip by a person's hand when holding the handgrip and operated forcibly but controllably by squeezing the manual driver and the handgrip, said manual driver being slidable parallel to said passage and having a pawl engageable directly with at least one of the teeth of a ratchet-toothed rod of heat-liquefiable material in the passage for transmitting firm manual pressure to the melted material in the heating chamber, for forced discharge of melted material from the nozzle.

18. A dispenser for heat-liquefiable material in accordance with claim 17, wherein said manual driver has a hand-engageable part at the side thereof remote from said nozzle and wherein said handgrip has a hand-engageable part at the side of said handgrip nearest said nozzle so that a strong force can be applied easily to said driver by a person's hand while clutching said handgrip.

19. A dispenser for heat-liquefiable material in accordance with claim 17, wherein said pawl is constrained to reciprocate along said passage at the side of the passage nearest said handgrip for cooperating with a ratchet-toothed rod of heat-liquefiable material.